United States Patent [19]
Miner et al.

[11] 4,456,173
[45] * Jun. 26, 1984

[54] ENERGY LOSS DETECTION SYSTEM

[75] Inventors: David W. Miner; Mark D. Driscoll; John E. Sorenson; Robert T. Kirchner; David A. Keech, all of Three Rivers, Mich.

[73] Assignee: Armstrong International, Inc., Three Rivers, Mich.

[*] Notice: The portion of the term of this patent subsequent to Dec. 15, 1998 has been disclaimed.

[21] Appl. No.: 303,251

[22] PCT Filed: Jan. 9, 1981

[86] PCT No.: PCT/US81/00025
§ 371 Date: Sep. 2, 1981
§ 102(e) Date: Sep. 2, 1981

[87] PCT Pub. No.: WO81/02203
PCT Pub. Date: Aug. 6, 1981

Related U.S. Application Data

[63] Continuation-in-part of Ser. No. 113,835, Jan. 21, 1980, Pat. No. 4,305,548.

[51] Int. Cl.³ .............................................. F24D 1/00
[52] U.S. Cl. ........................................ 237/67; 73/200
[58] Field of Search ...................... 73/200; 236/52, 94; 237/9 R, 67

[56] References Cited
U.S. PATENT DOCUMENTS

| 3,048,035 | 8/1962 | Richards et al. | 73/200 |
| 3,926,368 | 12/1975 | Geen | 236/94 |
| 4,178,801 | 12/1979 | Cassell | 73/200 |
| 4,249,697 | 2/1981 | Savage, Jr. | 236/94 |

Primary Examiner—Herbert Goldstein
Attorney, Agent, or Firm—Flynn, Thiel, Boutell & Tanis

[57] ABSTRACT

An energy loss detection system includes an apparatus (22) for measuring loss of the vapor phase of a bi-phase fluid. Such apparatus is interposable in an energy transfer circuit downstream of an energy consumer device (14), intended to take energy from the bi-phase fluid by converting the vapor phase to liquid, and upstream of a potential energy loss device (20). The apparatus includes a separator (24) for separating the vapor and liquid phases of the bi-phase fluid into separate flow paths. A probe (51) senses the flow rate of the vapor phase through the separator and produces a signal related thereto. An output apparatus (72) includes a readout device (79) responsive to the probe signal for producing a display indicative of vapor flow rate and hence of energy loss downstream of the separator.

9 Claims, 9 Drawing Figures

ENERGY LOSS DETECTION SYSTEM

The present application is a continuation-in-part of U.S. application Ser. No. 113,835, filed Jan. 21, 1980, now U.S. Pat. No. 4,305,548.

FIELD OF THE INVENTION

This invention relates to a system for detecting vapor phase loss, in a bi-phase fluid circuit, such as in a steam circuit.

BACKGROUND OF THE INVENTION

The present invention was developed in view of a vexing energy loss problem in steam systems, but is not limited to that environment.

In conventional systems, as steam transfers its heat energy to a load it condenses. A steam trap discharges this condensate, while retaining the steam within the system. However, as the steam trap wears out, it increasingly loses steam and wastes energy.

Three known methods have commonly been used in an attempt to determine the steam loss of a steam trap.

1. Visual requires the discharge of the trap to the atmosphere for observation. However, atmospheric discharge is not always possible, due to the way that the trap has been installed into a condensate return system.

Moreover, with several different types of steam traps on the market, visual observation requires considerable training and skill. While it may be possible to detect a gross trap failure, estimating the magnitude of any steam losses cannot be done accurately as the following table illustrates

| Trap at 150 psig Discharges | At Atmospheric Pressure Mass Flow | Discharge Changes to Volume Flow |
|---|---|---|
| 1. 82 #/hr. Cond. | 68.6 #/hr. Cond. | 1.15 cu. ft./hr. Cond. |
| 0 #/hr. Steam | 13.4 #/hr. Steam | 360 cu. ft./hr. Steam |
| 2. 50 #/hr. Cond. | 41.6 #/hr. Cond. | .695 cu. ft./hr. Cond. |
| 5 #/hr. Steam | 13.4 #/hr. Steam | 360 cu. ft./hr. Steam |

In the table above, Trap 1, has no steam loss, but actually discharges a considerable amount of steam at atmospheric pressure due to flashing of the condensate as the pressure is reduced. As the human eye actually sees a volume flow, in the above example a large cloud of steam and a few drops of water would be seen.

On the other hand, Trap 2, which is defective and has a steam loss, discharges the same volume of steam as Trap 1 but a somewhat smaller volume of condensate. However, the human eye would be very hard pressed to determine which of these two traps actually had a steam loss.

2. In some areas it has been common practice to test traps by reading upstream and downstream trap temperatures with a pyrometer. If the temperature difference is very high, the trap has been considered satisfactory, while if the temperature difference is very low, the trap has been considered defective.

This tends to be a very dubious method as the outlet temperature follows the saturation temperature/pressure relation for steam. A trap with a high rate of steam loss, discharging to a much lower pressure, will display a very high temperature difference. On the other hand, a good trap, discharging through a very low pressure difference, will display very low temperature difference. In actual field service with a condensate return system, the trap outlet pressure is seldom, if ever, known. Accordingly, such temperature difference readings can be highly misleading as to the condition of the trap.

3. A highly trained person using a stethoscope or an ultrasonic device can inspect a trap for steam loss. However, considerable skill and training is required to understand the normal mode of operation of all the various available traps and to be able to distinguish abnormal operation. Sound devices generally can only be used to make a good/bad judgment of trap operation, and cannot accurately quantify the magnitude of a steam loss.

Accordingly, such known prior methods have not been entirely satisfactory.

Accordingly, the objects of this invention include provision of:

An energy loss detecting apparatus which is free of the foregoing limitations of the above-discussed known prior methods.

A system, as aforesaid, which, for measuring a steam loss in a steam trap, remains at supply steam pressure and avoids pressure drops as may cause flashing of condensate to steam, and which is capable of high accuracy by measuring directly the steam loss to the steam trap.

A system, as aforesaid, capable of monitoring steam trap condition regardless of the type of steam trap.

A system, as aforesaid, capable of displaying steam flow in any desired units, and of reducing the skill level required of the operator.

A system, as aforesaid, capable of measuring the velocity of the vapor phase independent of the liquid phase.

SUMMARY OF THE INVENTION

The objects and purposes of the invention are met by providing an energy loss detecting system for measuring the rate of flow of the vapor phase of a bi-phase fluid flow, in the presence of an unknown quantity of the liquid phase. Means separate the vapor phase from the liquid phase. Means produce a signal related to the vapor phase flow rate. Energy loss due to a faulty steam trap is measurable by interposing the vapor flow rate measuring apparatus in a steam line between a steam consuming device and the steam trap.

DETAILED DESCRIPTION

Figure 1:
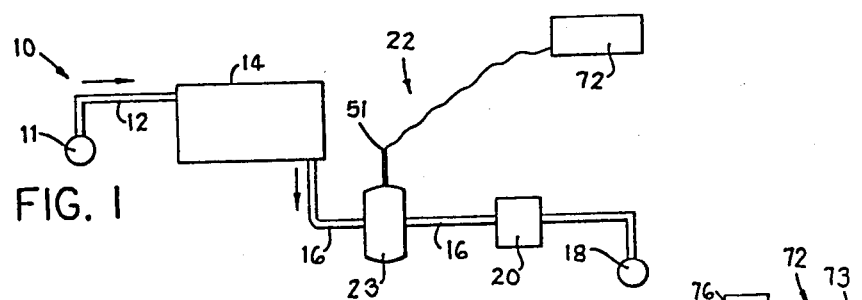
FIG. 1 is a schematic diagram of a steam circuit incorporating an energy loss detection system embodying the invention.

FIG. 1 discloses a bi-phase fluid circuit 10 comprising a conventional steam source 11 applying steam through a conduit 12 to a steam consumer device, or load, 14. In normal operation, the heat energy in the steam is transferred to the consumer device 14. The consumer device 14 may be a heat exchanger, or other device in which heat is converted to mechanical, electrical or other energy forms.

A further conduit 16 connects the return side of the heat exchanger to a return main 18 leading back to the steam source 11, to enable steam source 11 to reheat the returning condensate to steam. The steam source 11 may include, for example, a conventional boiler and fluid circulating pump.

A steam trap 20, in the return conduit 16 from the steam consumer device 14, may be of any conventional type, for example as in U.S. Pat. No. 4,149,557, issued Apr. 17, 1979.

As heat in the steam is transferred to the consumer device 14, the steam condenses and is released to the conduit 16 as condensate. The steam trap 20 is to discharge this condensate to the return main 18, but prevent escape of steam, to maximize the transfer of heat energy to the consumer device 14 by maximizing conversion of steam to condensate in the consumer device.

To the extent above described, the steam circuit 10 is conventional.

The steam trap may become damaged or may wear, permitting steam to be lost.

Applicants have recognized that steam flow to the steam trap is thus a measure of the energy loss, or waste, of the trap.

The present invention measures the energy (steam) loss due to a defect in the steam trap 20, by an apparatus 22. The apparatus 22 includes a sensing unit 23 interposed in the conduit 16 between the steam consumer device 14 and the steam trap 20. While shown in FIG. 1 as separate elements, it is contemplated that the sensing unit 23 may be integrated with the steam trap and share a common casing. The sensing unit 23 includes a separator 24 having a hollow, generally upstanding casing 25. An upstanding baffle 27 fixed within the casing 25 divides it into side-by-side inlet and outlet chambers 31 and 32. The casing 25 has inlet and outlet openings, here conventional pipe fittings 33 and 34 fixed to the peripheral wall of casing 25 and opening respectively into the inlet and outlet chambers 31 and 32. The inlet and outlet openings 33 and 34 are spaced above the bottom 37 and below the top 38 of casing 25.

Thus, the bottom portion of the casing 25, below the inlet and outlet openings 33 and 34 is normally filled with condensate. The baffle 27 extends downward below the inlet and outlet openings 33 and 34 and hence below the normal working condensate level L to block vapor flow through the bottom portion of casing 25 between the casing inlet and outlet openings 33 and 34. However, an opening 41 between the baffle 27 and the bottom 37 of casing 25, below level L, permits condensate flow past the baffle 27, from the casing inlet 33 to the outlet 34.

Above the inlet and outlet openings 33 and 34, a vapor port 42 provides gas flow communication between the inlet and outlet chambers 31 and 32 through the upper portion of the baffle 27. In the preferred embodiment shown, the vapor port 42 is an elongate transverse duct, here an open-ended tube 43, penetrating the baffle 27 and providing a suitable cross section, longitudinally extending vapor flow path through the casing 25. Passage of liquid through port 42 is avoided by spacing the vapor port well above the residual liquid level L and inlet and outlet openings 33 and 34, and by a splash-prevention ledge 46 extending transversely partway across the inlet chamber, vertically between the inlet opening 33 and vapor port 43, from the inlet side of baffle 27.

A vapor flow sensing probe 51 is fixed at 52 on the top portion 38 of casing 25 and extends through the casing wall into the vapor flow through tube 43. The probe senses the velocity of the vapor and provides an output signal which is a function of vapor phase flow rate. Various probes may be employed for this purpose, examples including hot wire anemometer, thermister, heater-thermocouple and Pitot tube probes.

Figure 3:
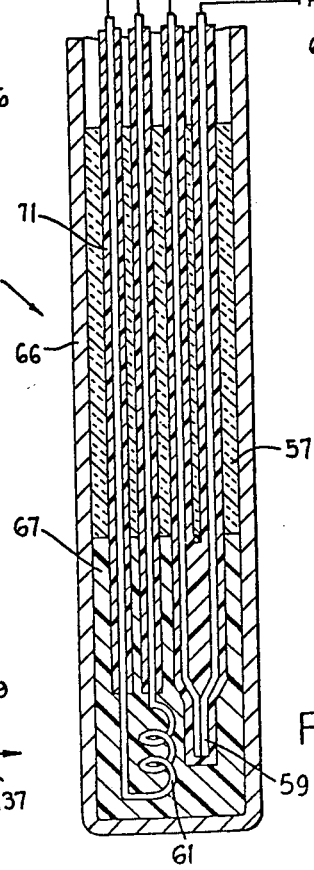
FIG. 3 is a schematic diagram showing a probe and readout circuit usable in the vapor flow rate measuring apparatus of FIG. 2.

By way of example, FIG. 3 schematically discloses a suitable probe 51 of the heater-thermocouple type, including a sensing thermocouple 59 heated above ambient temperature by an electric resistance heating element 61. As vapor velocity past the probe increases, the vapor flow carries away an increasing amount of the heat generated by heater 61 and thereby reduces the temperature at, and output signal of, sensing thermocouple 59. Accordingly, the output signal of the thermocouple 59 varies with changes in vapor velocity through port 42. The probe 51 conventionally includes a thermally conductive outer skin (e.g., of metal), a thermally conductive but electrically insulative filling 67 surrounding heater 61 and sensing thermocouple 59, as well as conventional electrical insulation, as at 71, on the conductors leading to the heater and thermocouple.

The probe, above the thermocouple 59 and heater 61, may be filled with a conventional thermal insulating barrier 57. Also, an additional reference thermocouple (not shown) may be positioned in thermal isolation from the heater 61 for sensing the ambient temperature of the vapor adjacent the probe, so as to cancel the effect of changes in ambient vapor temperature on the output signal of sensing thermocouple 59.

In FIG. 3, heater 61 is energized from a conventional electric power source 73, controlled by switch 74. The electric power fed to the heater is preferably monitored, as by a conventional wattmeter 76. The electrical output of the thermocouple 59 is fed through conductors 63 and 64 to a suitable readout and/or alarm circuit 72, here a voltmeter 79 driven by a conventional amplifier 81. With a given electrical input to the heater 61, as ascertained from the wattmeter 76, the meter 79 may be calibrated, for a given probe 51 and separating unit 24, in any desired units of flow measurement, such as CFM, SCFM, pounds per hour, feet per second, cost per unit time, etc. Instead of, or in addition to, a continuous readout device such as meter 79, a two-state output or alarm device (not shown) may be employed to produce a good/bad judgment in response to the output of probe 51. Readout systems of other types, such as electronic, hydraulic, etc. may be employed.

The separator 24 separates the two phases of the bi-phase fluid entering through its inlet opening 33 and permits recombination for discharge from its outlet opening 34. The entering bi-phase fluid (e.g., condensate and steam) expands into the substantially greater cross-sectional area of the casing which expansion substantially decreases the velocity of the bi-phase fluid within the separator and allows the liquid phase to drop into the lower portion of the separator casing, through the lower opening 41 of the baffle and out the outlet opening 34. Liquid in the bottom of the casing 25 seals the opening 41 against vapor phase flow therethrough. Accordingly, the vapor phase can only flow through the top portion of the separator casing 25, through the vapor port 42, to the outlet opening 34.

Accordingly, the separator is a passive element within the conduit 16. The flow rate through the separator 23 is thus a function of the bi-phase fluid circuit 10 in which it is installed, rather than of the separator structure itself.

Applicants' apparatus can determine the magnitude of the steam loss from trap 20. Locating the separator 24 between the steam consumer 14 and steam trap 20 has several advantages. First, the separator, being upstream of the trap, always remains at the pressure of steam source 11, which avoids problems resulting from flashing of condensate to steam as the result of a pressure drop. Second, high measurement accuracy is achieved because any steam passing through the steam consumer to the trap is an energy loss. More particularly, in theory all heat energy should be used in the heat exchanger and none lost downstream. Such steam loss must pass through the separator 24 of sensing unit 23 and thereby be measured, independent of which phase it is in when discharged from the trap 20. Accordingly, it is immaterial whether the trap defect is such that it discharges this steam directly as a live steam loss, or permits same to condense in the trap and be discharged as condensate.

By permitting the readout device, as at 79 in FIG. 3, to display the steam flow (or loss) in the most applicable units, the skill required of the person that is to determine the steam loss is minimized. Moreover, operation is independent of the particular type of steam trap used.

If desired, the readout circuit 72 of FIG. 3 may be permanently connected to the corresponding separator 24 and probe 51. On the other hand, the readout circuit 72 may be a portable unit usable alternately with many different separator-probe units by a suitable detachable connection, schematically indicated at 81 (FIG. 3) to the electrical conductors of the probe 51.

The probe 51 may be removably mounted on the top portion 38 of casing 25, for example by threaded engagement. When measurement is not required at a given separator 24, a conventional threaded plug (not shown) can replace the removable probe. The removable probe can then be installed in other separators 24, thus minimizing the number of probes required to service a plurality of separators. Moreover, removal of the probe 51 from the separator casing 25, during intervals when no measurement is needed, would substantially reduce or eliminate damage to or contamination of the sensing end of the probe where the fluids passing through the separator incorporate hostile materials.

The vapor flow measuring portion of the apparatus disclosed is also usable for other steam flow measurements, for example of steam flow into or out of control valves, bypass valves, heat exchangers, steam traps and so forth. Use in refrigeration systems for vapor phase refrigerant flow measurement is also contemplated.

Figure 2:
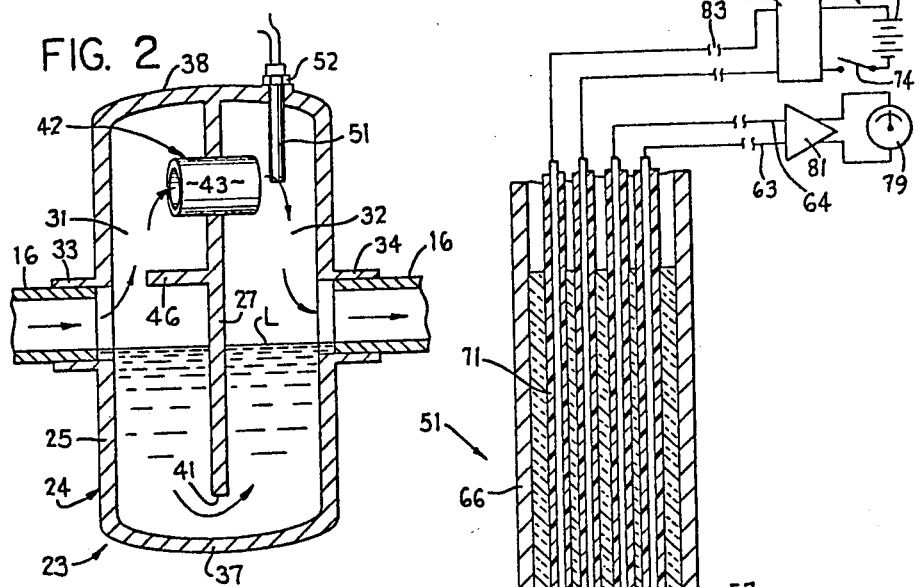
FIG. 2 is an enlarged, fragmentary, central cross-sectional view of a portion of the energy loss detection system of FIG. 1.
Figure 5:
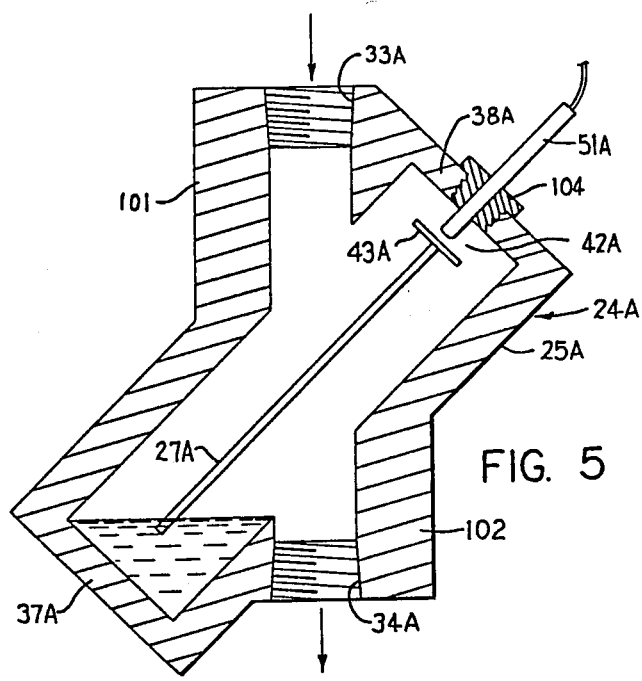
FIGS. 4 and 5 are central cross-sectional views of a modified energy loss detection system oriented for installation in vertical and horizontal conduit lines, respectively.
Figure 4:
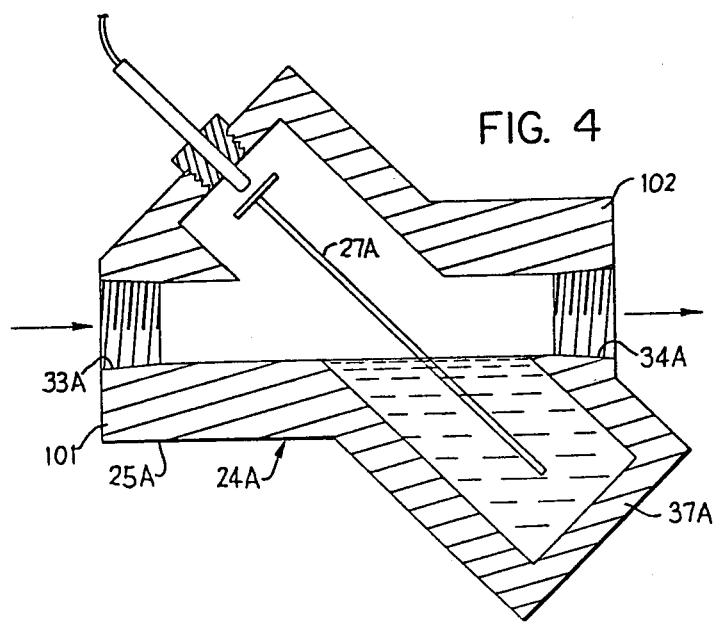

FIGS. 4 and 5 disclose a modified separator 24A in which the casing 25A has inlet and outlet openings 33A and 34A, respectively, aligned on a common axis at an angle of about 45° to the length of the casing 25A. The inlet and outlet openings 33A and 34A are in bosses 101 and 102, respectively, angularly arranged on the casing 25A. The inlet and outlet openings 33A and 34A are spaced from the bottom wall 37A of the casing. Preferably, the casing bottom wall 37A is offset below the outlet opening 34A by approximately the width of the casing interior. The baffle 27A extends well below both of the openings 33A and 34A. Thus, the separator 24A can be coaxially inserted in a horizontal conduit line, as in FIG. 2, or in a sloped, or even vertical conduit line because the inlet and outlet openings 33A and 34A can be sloped or vertically aligned as in FIG. 5. The preferred fluid flow through the separator 24A is indicated by the arrows.

The separator 24A is further modified by forming the vapor port 42A between a ledge 43A fixed atop the baffle 27A and the top wall 38A of the casing. The probe 51A is releasably secured by a threaded fitting 104 through the top wall 38A of the casing and extends in substantially centered relation into the port 42A to monitor vapor flow.

Figure 6:
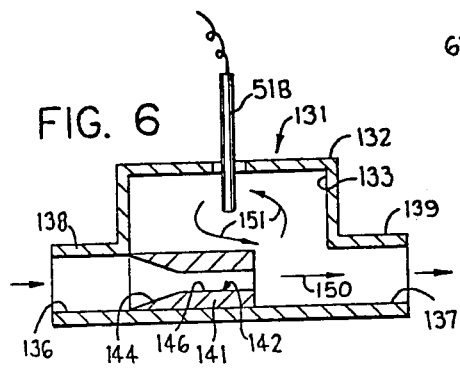
FIG. 6 is a central cross-sectional view of a further modified energy loss detection system.

FIG. 6 discloses a further modified separator 131 comprising a casing 132 having a central chamber 133 and coaxially aligned inlet and outlet openings 136 and 137 on opposite sides of the chamber 133. The inlet and outlet openings 136 and 137 are here provided in projecting bosses 138 and 139 on the casing 132 for connection by any convenient means not shown in a fluid carrying conduit as above discussed with respect to separators 24 and 24A.

However, the separator 131 operates on a different principle than the aforementioned embodiments. Particularly, a nozzle 141 fixed within the inlet side of the chamber 133 includes a central passage 142 coaxially aligned with the inlet and outlet openings 136 and 137. The central passage 142 is funnel-shaped, having an inlet portion 144 in direct sealed communication with the inlet opening 136 and necked down therefrom to a reduced cross section cylindrical outlet portion 146. The outlet end of the nozzle passage outlet portion 146 is aimed toward but spaced from the outlet opening 137 to be in free communication with the remainder of the chamber 133. A probe 51B, which may be similar to probes 51 and 51A, is mounted on the casing 132 and extends into the chamber 133 in transversely offset relation to the nozzle 141. The probe 51B is thus spaced from the coaxial path through the inlet opening 136, nozzle 141 and outlet opening 137.

In operation, a fluid entering the inlet opening 136 is reduced in flow cross section and tends to increase in flow velocity as it travels through the nozzle 141. In a bi-phase fluid, such as a mixture of water and steam, the liquid phase tends to exit the nozzle 141 and pass out the outlet opening 137 as a limited cross section jet, as generally indicated by the arrow 150. A portion of the vapor phase leaves the outlet opening with the liquid phase. As in the foregoing embodiments, the temperature of the probe 51B decreases or increases with an increase or decrease, respectively, in the amount of vapor phase in the bi-phase fluid passing through the separator 131. It is theorized that a portion of the vapor phase circulates through the chamber 133 past the probe 51B, as indicated by the arrows 151, with the vapor flow past the probe increasing with the amount of vapor in the bi-phase fluid.

Figure 7:
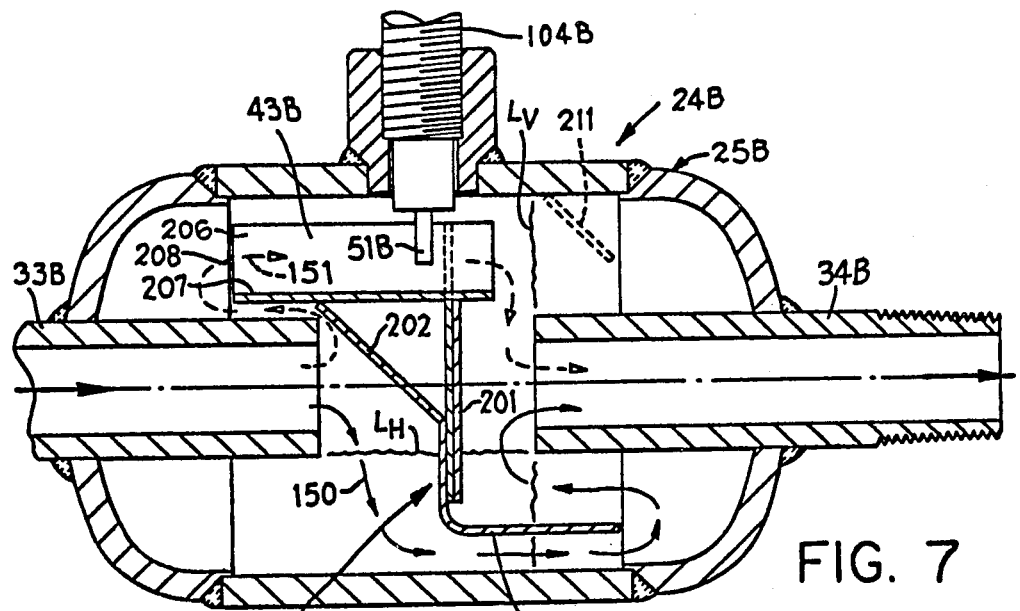
FIG. 7 is a central cross-sectional view of a further modified energy loss detector.

A modified separator 24B (FIG. 7) operates with its inlet and outlet openings 33B and 34B aligned in either horizontal or vertical pipelines. The tubelike inlet and outlet openings 33B and 34B extend into the casing 25B, toward a central baffle 27B. Baffle 27B extends the width (into the page in FIG. 7) of the casing 25B and includes a lateral plate 201 facing outlet 34B, a diagonaly plate 202 facing inlet 33B at an angle and an axial flange extending from the edge of lateral plate 201 in the outlet direction. A vapor channel 43B has side walls 206 and a bottom wall 207 and, from its inlet end 208 laterally spaced from inlet 33B, extends past the edge of diagonal plate 202 and through a slot in lateral plate 201 to a point axially upstream from and laterally offset from outlet 34B. A probe 51B extends into the intermediate part of trough 43B from a fitting 104B threaded through the peripheral wall of casing 25B. Further diagonal baffles, for example as in dotted lines at 211, may lie in the vapor path from inlet 33B through trough 43B to outlet 34B.

The baffle structure 27B converts the velocity pressure of the incoming steam-water mixture to a static pressure, by establishing a sinuous path through which it must travel and thereby substantially reducing the velocity of the incoming bi-phase fluid.

Solid arrows 150 and dotted arrows 151 respectively indicate water and vapor flow through the apparatus. Reference characters $L_H$ or $L_V$ indicate typical water surface levels with the separator 24B in a horizontal or vertical pipeline. In operation, water levels $L_H$ and $L_V$ may vary.

With steam flow below a preselected maximum for a particular separator 24B, water level $L_H$ in a horizontal installation strays above axial flange 203 and water level $L_V$ stays above the free end of axial flange 203 in a vertical installation, to form a water trap blocking steam flow around the flange 203 and requiring all steam to pass probe 51B. If steam flow exceeds the maximum (for example 20 pounds per hour), steam pressure depresses water level $L_H$ or $L_V$ enough to break the water trap and permit some steam to flow along arrows 150 past the free end of axial flange 203. The output signal of probe 51B is thus proportional to steam flow up to the maximum but is not expected to proportionally increase thereabove. However, the baffles (as at 201, 202, 203, 43B and if present 211) are arranged so that such breaking of the water trap does not itself suddenly drop stream flow past probe 51B (for example from 20 down to 5 pounds per hour). Thus, the probe can signal steam flow values up to the preselected maximum and thereafter continue to indicate maximum.

In some installations, small probe size is required, for example diameters of ⅛th inch outside and less than 0.100 inch inside, making it difficult to manufacture a four wire probe. The problem is solved by probe 51C (FIG. 8) in which thermocouple 59C and heater wire 61C are connected electrically in series at 220. Wires 221 and 222 connect to the opposite sides of heater 61C and thermocouple 59C for connection to monitoring and heating circuitry (as in FIG. 9). The thermocouple 59C is repeatably located in probe 51C, as in a silver brazed deposit 225 fixed to probe skin 66C. If thermocouple conductor 224 is of the same material as wire 221 (different from wire 222), then the net thermocouple signal is from thermocouple tip 59C, regardless of the material of heater wire 61C.

A metal cap may be substituted for the silver braze 224. The outer skin 66C (made of appropriate metal) may be substituted for conductor 222, by connecting the lower end of conductor 224 thereto.

Figure 8:
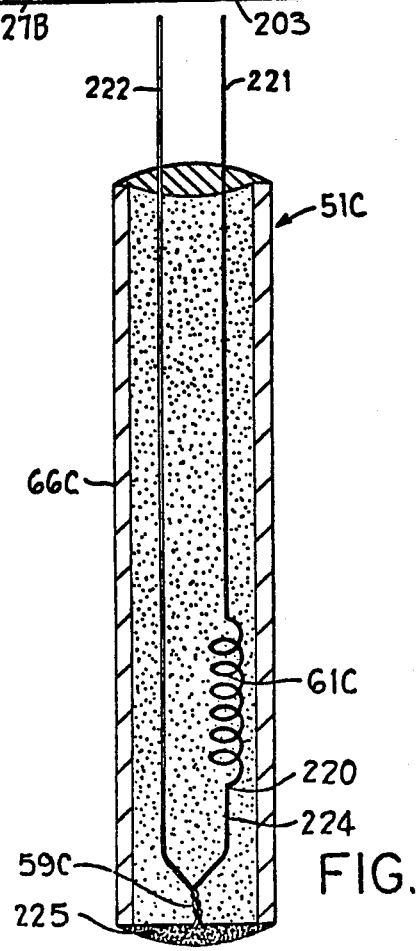
FIG. 8 is a central cross-sectional view of a two wire probe.
Figure 9:
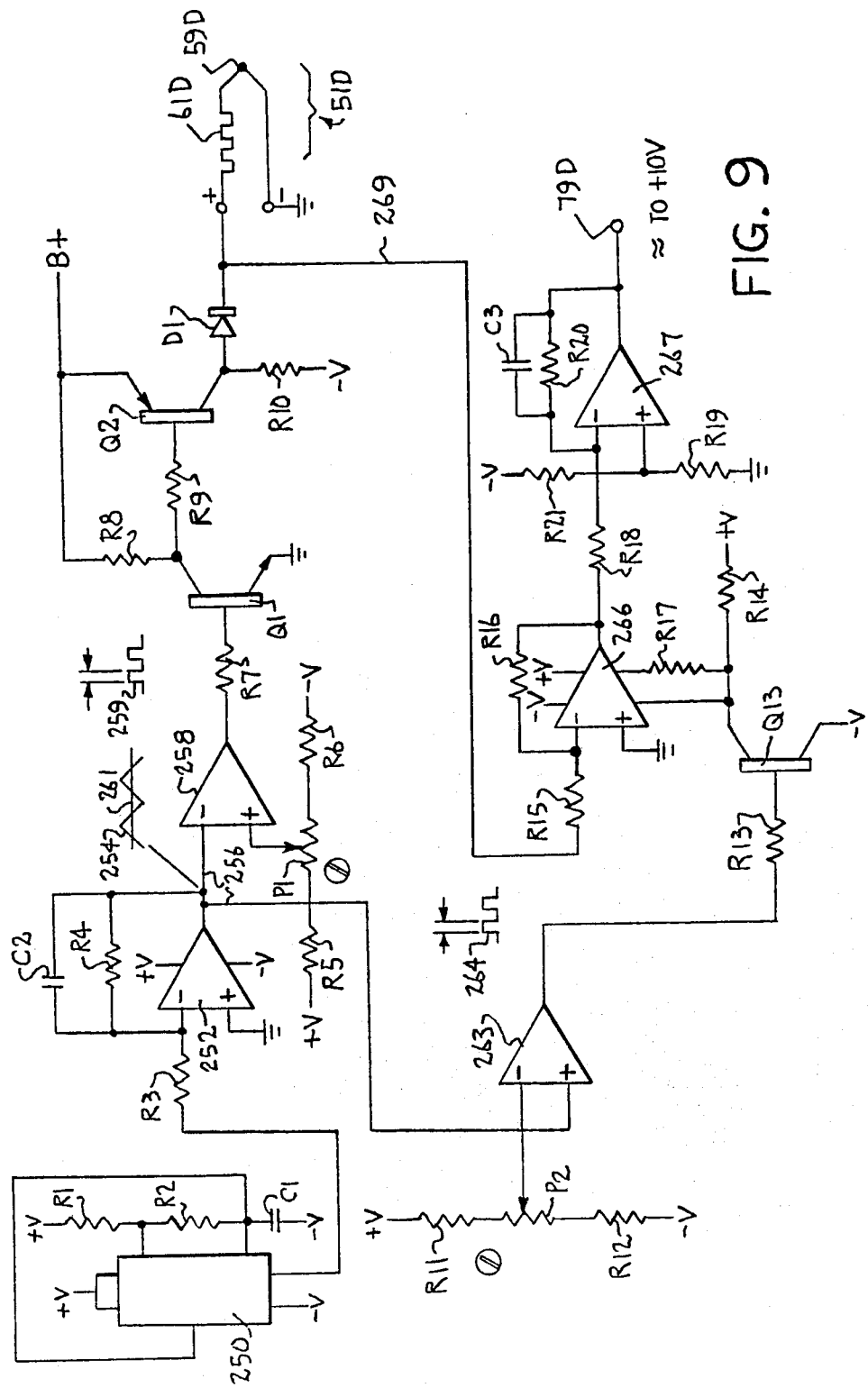
FIG. 9 is a schematic diagram of a circuit in which the FIG. 8 probe is usable.

FIG. 9 acts as a sample and hold circuit for alternating electric current pulses to the heater 61D of a probe 51D with sampling of the electric signal from thermocouple 59D, to permit the heater and thermocouple to be connected in series as in FIG. 8.

In FIG. 9, a conventional pulse generator 250 (for example a commercial integrated circuit timer) is powered by positive and negative circuit voltages $+V$ and $-V$ (for example $\pm 12$ volts DC). Pulse generator 250 is frequency controlled by resistors R1 and R2 and capacitor C1 to apply a low frequency square wave (form example 4 Hz) signal through a resistor R3 to a conventional amplifier-integrator 252. The latter has integration elements C2 and R4 and produces a saw tooth signal 254 at the same frequency on a line 256 driving the negative input of a comparator 258. Comparator 258 generates a square wave pulse 259 when the saw tooth 254 rises above a threshold voltage 261 set by a heat pulse adjusting potentiometer P1 connected in a resistive voltage divider R5, P1, R6. Adjusting potentiometer P1 adjusts the width of positive heat pulses 259 and, as discussed below, the average current fed through heater 61D. The positive pulses 259 are applied through a resistor R7 to periodically turn on a small signal NPN transistor Q1. Transistor Q1 receives collector bias through a resistor R8 from a conventional constant voltage supply B+. The turned on transistor Q1 conducts through a low value resistor R9 from the base of a PNP power transistor Q2, causing the latter to conduct from the B+ supply through a diode D1 and thence through series heater coil 61D and thermocouple 59D to circuit ground. This heats the probe 51D during each positive pulse 259. Transistor Q2 receives emitter bias at R10.

Applying saw tooth signal 254 on line 256 to the positive input of a further comparator 263 produces a sense enabling square wave pulse train 264 out of phase with heat pulse train 259. The width of the positive sense enabling pulses 264 are controlled at the negative comparator input by a sense pulse adjustment potentiometer P2 in series with voltage divider resistors R11 and R12. The positive sense pulses 264 through a resistor R13 turn on a further NPN transistor Q3 to enable a two-stage instrumentation amplifier 266, 267. The latter includes two DC operational amplifiers 266 and 267, resistors R14 through R21 (including gain adjust and zero adjust resistors R16 and R21) and a capacitor C3. Amplifier 266, 267 is thus enabled in spaces between the heat pulses 259 and amplifies the voltage of the thermocouple 59D appearing across a line 269 (from between diode D1 and heater 61D) and circuit ground. The output stage 267 amplifies such periodic thermocouple signal to drive a meter or the like at 79D. Adjustment of potentiometer P2 assures that the thermocouple voltage sensing times are spaced between heat pulses 259 and do not overlap same.

We claim:

1. A steam system, including:
   a source of steam;
   a steam retaining device for retaining steam within said system, said device being connected along a steam line downstream of said steam source;
   energy loss measuring means for measuring steam loss in said steam retaining device, and including means interposed in said steam line between said source and said steam retaining device for measuring the flow rate of steam therethrough to said steam retaining device, independent of any condensate flow therethrough.

2. The apparatus of claim 1, in which said means for measuring the flow rate of steam comprises:
   means fixed in the steam line for separating steam and condensate phases in the fluid flow in said steam line and directing the steam along a path free of condensate; and means responsive to flow of said steam through said path for producing a signal related to the steam flow rate.

3. The apparatus of claim 2, in which said separating means comprises a hollow separator casing divided into inlet and outlet chambers by a baffle, an inlet opening in the casing wall for admitting said fluid flow into said inlet chamber, and outlet opening for discharging said fluid flow from said outlet chamber, said inlet and outlet openings being substantially aligned along an axis passing through the central portion of said baffle, said baffle being open at a location spaced below said inlet and outlet openings for condensate flow therepast from said inlet chamber to said outlet chamber, means defining a steam port through said baffle above said inlet opening and outlet opening for steam flow from said inlet chamber to said outlet chamber, said steam port being spaced above the normal liquid level in said casing, said steam flow responsive means including probe means located at said steam port to sense the rate of steam flow therethrough.

4. The apparatus of claim 3, in which the axis of said inlet and outlet openings is tilted at an acute angle to said baffle and to the length axes of said inlet and outlet chambers, the bottom end of said chambers and of said baffle being spaced below said inlet and outlet openings both with said inlet and outlet openings aligned vertically and with said inlet and outlet openings aligned horizontally, whereby said separating means can be inserted coaxially into both vertical and horizontal conduit lines.

5. The apparatus of claim 2, in which said separating means comprises a hollow separator casing containing a nozzle coaxially aligned with inlet and outlet openings on opposite sides of the casing and extending from said inlet opening only partway to said outlet opening, said nozzle having a passage therethrough necked down from said inlet opening to form a reduced cross section jet of increased velocity aimed through said outlet opening, whereby the condensate part of the fluid passes in such jet directly from said nozzle through said outlet opening, said flow responsive means comprising a probe inserted into said casing and offset from the coaxial path through said inlet, nozzle and outlet for monitoring a circulating flow of steam released by said nozzle into the interior of said casing.

6. The apparatus of claim 2, in which said means for producing a signal is a probe comprising an electricity generating temperature sensor for emitting an electrical signal related to changes in temperature of fluid flowing past said probe, said probe further including an electrically energized resistance heater connected electrically in series with said sensor.

7. The apparatus of claim 6, in which said sensor is a thermocouple fixed at the end of said probe exposed to said flow.

8. The apparatus of claim 2, in which said means for producing a signal comprises a probe including a sensor emitting a signal related to temperature and an electrically energizable heater; and a sampling and heating circuit comprising a low frequency pulse source, means responsive to said pulse source for applying periodic pulses of heating current to said series heater and sensor, and means enabled between heat pulses for sensing the electrical output of said sensor and thereby providing a temperature responsive readout.

9. A steam system, including:

a source of steam;

a steam retaining device for retaining steam within said system, said device being connected along a steam line downstream of said steam source;

energy loss measuring means for measuring steam loss in said steam retaining device, and including means interposed in said steam line between said source and said steam retaining device for measuring the flow rate of steam therethrough to said steam retaining device, independent of any condensate flow therethrough, said means for measuring the flow rate of steam comprising (1) means fixed in the steam line for separating steam and condensate phases in the fluid flow in said steam line and directing the steam along a path free of condensate and (2) means responsive to flow of said steam through said path for producing a signal related to the steam flow rate, said separating means comprising a hollow separator casing divided into inlet and outlet chambers by a baffle, an inlet opening in the casing wall for admitting said fluid flow into said inlet chamber, an outlet opening for discharging said fluid flow from said outlet chamber, said inlet and outlet openings being substantially aligned along an axis passing through the central portion of said baffle, said baffle being open at a location spaced below said inlet and outlet openings for condensate flow therepast from said inlet chamber to said outlet chamber, means defining a steam port through said baffle above said inlet opening and outlet opening for steam flow from said inlet chamber to said outlet chamber, said steam port being spaced above the normal liquid level in said casing, said steam flow responsive means including probe means located at said steam port to sense the rate of steam flow therethrough, said inlet and outlet openings being formed by tubes extending toward each other into said chamber, said baffle including a lateral plate facing said outlet opening, a diagonal plate facing said inlet opening and an axial flange extending from one edge of the lateral plate in the outlet direction, said steam port being a trough extending through said lateral plate at the opposite edge of the latter, said trough overlapping said inlet tube, said steam flow responsive means including a probe extending into said trough.

* * * * *